3,417,078
CATIONIC STARCH

Chim P. Patel and Ronald E. Pyle, Granite City, Ill., assignors to Union Starch & Refining Co., Inc., Columbus, Ind., a corporation of Indiana
No Drawing. Filed Dec. 9, 1966, Ser. No. 600,378
6 Claims. (Cl. 260—233.3)

ABSTRACT OF THE DISCLOSURE

A cationic starch especially useful in the manufacture of paper is prepared by reacting starch in the form of a slurry, for example, with the reaction product of 1D(2-hydroxyethyl), 2Dn-heptadecenyl-2 imidazoline and a cross-linking agent such as dichlorobutene.

---

The present invention relates generally to starch derivatives and, more particularly, to a novel cationic, water soluble starch product and to a novel method for producing it from unmodified starch. Specifically, the present invention pertains to a cationic starch prepared from unmodified starch by reacting with an imidazoline compound and a cross-linking agent.

The imidazoline compound referred to is 1D(2-hydroxyethyl), 2Dn-heptadecenyl-2 imidazoline. For convenience this product is referred to in the specification as the "imidazoline compound" or "said imidazoline." The said compound is sold commercially under the trademark "Onamine RO" (Onyx Chemical Co.).

An object of the present invention is to produce a modified starch product which gives higher peak viscosity pastes than unmodified starch when cooked with water.

A second object of this invention is to produce a modified starch product which gelatinizes at a lower temperature than common for the unmodified starch from which it is made.

A third object is to prepare a modified starch product which yields a softer cold paste than that of the unmodified starch.

A fourth object is to produce a modified starch product which gives a clearer hot and/or cold paste than that of the unmodified starch.

Another object is to prepare a modified starch product which has superior cationic properties than common for the unmodified starch from which it is made.

Another object of this invention is to produce a modified starch product having the above-listed properties by a method which does not disrupt the starch granules through gelatinization.

A further object of this invention is to produce a modified starch product having the above-listed properties by a method which reduces treatment costs considerably.

In the process of this invention, starch slurries are treated under conditions especially suited to equipment common to the industry.

This invention is based on the discovery that the treatment of starch with said imidazoline compound which has been previously mixed with one or more cross-linking agents produces modified starch products which yield higher paste viscosities and superior cationic properties than obtained from the unmodified starch. In order to simplify the disclosure relating to the effects of various conditions and amounts of reactants on the starch, dichlorobutene has been selected as the cross-linking agent to show such effects. It will be understood, however, that the reactions with other cross-linking agents would be analogous to the reactions obtained by dichlorobutene as the cross-linking agent.

Briefly, the objects of the present invention are obtained by reacting relatively small amounts of the premix of said imidazoline and a cross-linking agent with starch, under controlled conditions of pH, time, temperature, Baumé of starch slurry. A specific object of this invention, therefore, is obtained by treating an ungelatinized starch slurry with reactant products of said imidazoline and a cross-linking agent. The starch derives its cationic properties from the imidazoline compound. Said imidazoline compound, however, when added, per se, is only absorbed on the starch. Cross-linking agents such as dichlorobutene act very rapidly on starch or with the imidazoline compound. Therefore, to obtain the desired and most uniform effect, the cross-linking agent and imidazoline compound should be premixed. When the two reactants are added separately a cross-linked starch with some cationic properties is obtained since the starch and the imidazoline compound are competing for the available cross-linking agent.

In the following teachings of the present invention, a starch slurry, i.e., unmodified corn starch granules and water at a temperature of about 68°–130° F. and with a Baumé of 14 to 21, is acidified or made alkaline to adjust the pH thereof to preferably between 6 to 10. The starting pH of the slurry is usually in the neighborhood of about 3–5 and will depend upon the source of the corn, the time of the year of its harvest and conditions in the plant which produces the starch slurry. Any base or acid may be used which will adjust the pH to a suitable level, such as sodium carbonate ($Na_2CO_3$), hydrogen chloride (HCl) or the like. It should be borne in mind that the base or acid is not used to "modify" the starch but to adjust the pH of the slurry prior to the addition of the reactant.

As already noted above, the imidazoline compound and "dichlorobutene" or other cross-linking agent are preferably reacted before adding to the starch slurry. The two reactants need not be mixed or reacted in stoichiometric proportions and very satisfactory results are obtained when they are present in equal amounts by weight.

The amount of the reactant products used for modification may vary from 1.0% to about 10.0% (from a minimum of about 0.5% to a maximum of about 5.0% of either reactant), based on dry substance starch. With 2.0% reactant products, a significant increase of hot paste viscosity in water and good cationic properties are noted. As more reactant is reacted with the starch, the viscosity of the modified starch increases. The reaction can be conducted at a pH level above about 6 and up to about pH 10. The preferred pH range is 8–9.

The reaction proceeds satisfactorily at temperatures of about 68° F. to 130° F. Some decrease in hot paste viscosity is observed at temperatures between 120° F. and 130° F. Starch slurries at about 100–110° F., as delivered to the drying equipment in starch plants, work very satisfactorily in the process. The reaction time is somewhat important if the high hot peak viscosity of the modified starch products is required. However, all of the starch derivatives obtained by varying the time of the reaction between about 1 to 24 hours have given positive cationic tests. Starch slurries reacted from 6 to 24 hours or more before being sent to the dryers have been found to be very satisfactory. Occasionally, it is not possible to dry a reacted starch immediately and the delay of 10 hours or more has not caused any change in the viscosity or cationic properties of the modified starch.

The starch may be treated in the form of a slurry as it comes from the final stage of the wet milling process. The slurry may have almost any density. When slurries of 14 to 21 Baumé have been treated under otherwise similar conditions, the resultant viscosities and other properties of the products are substantially the same. There is an obvious advantage in being able to treat slurries of unmodified starches and the invention is described by the treatment of such slurries. It is obvious, however, that the process can be applied to modified starches capable of being cross-linked.

After treatment with the imidazoline-dichlorobutene reactant, the slurries are filtered and the starch is dried at about 240° F., for example, to about 10% moisture.

The measurement of the viscosity of hot starch pastes is used in the industry to determine the degree of modification of starch products. Hot paste viscosity is commonly determined by the Scott method and the Corn Industries' Viscometer method. Procedures for these methods of analysis are described by R. W. Kerr in his book entitled, "Chemistry and Industry of Starch."

The percentage of starch retention by shredded paper pulp was determined according to the following procedure: 0.5 gram starch (dry substance basis) was cooked with water to make 50 ml. paste and diluted to 200 ml. with hot water (140° F.). This solution was poured through 10.0 gm. pulp whiuh has been saturated with water. When the filtration was completed, the pulp was rewashed with 100 ml. hot water. Then 100 ml. of the filtrate was evaporated to dryness and percent starch retained by the pulp was determined.

Calculations:

$$\frac{0.50-3\frac{(\text{gm. residue})}{100}}{0.50} \times 100 = \% \text{ retention}$$

In addition to these tests, the percentage of nitrogen was determined by Kjeldahl method. Cationic properties were determined qualitatively by treatment with "Light Green S.F. Yellowish" dye.

The following examples further illustrate the process of the invention.

The processes, as described below, are applied to corn starch. However, these processes are also suitable for modifying other starches, such as potato, tapioca, rice, grain, sorghum and wheat starches.

EXAMPLES 1–4

In this series of experiments, starch at 18° Baumé (60° F.) and pH of 9 was reacted for 20 hours at 80° F. with (1) the imidazoline compound, (2) dichlorobutene, (3) the imidazoline compound and dichlorobutene added separately, and (4) the reaction product of the imidazoline compound and dichlorobutene. Thereafter, the slurry was neutralized to pH 5.0, filtered, washed and the starch was dried at 240° F. to a 10% moisture content. The control was subjected to the same treatment but without any reactant. The properties of the modified and control starches are set forth in Table I below:

TABLE I

| Example | Reactant | Gel. temp., °C. | Max. Visc., gm./cm. | Visc. at 30', gm./cm. | Dye adsorption |
|---|---|---|---|---|---|
| Controls (1–4) | | 86 | 140 | 110 | None. |
| 1 | 2% imidazoline compound | 79 | 180 | 135 | Slight. |
| 2 | 1% dichlorobutene | 84 | 230 | 200 | None. |
| 3 | 1.5% imidazoline compound, 1.5% dichlorobutene. | 82 | 220 | 110 | Slight. |
| 4 | Reaction product of 1.5% imidazoline compound, 1.5% dichlorobutene. | 78 | 340 | 180 | Positive. |

In Example 3 the reactants have not been premixed before adding to the starch.

These results show that previous reacting of the imidazoline compnd and dichlorobutene before addition to the starch is desirable to obtain a cationic starch derivative. The reaction product of the imidazoline compound and dichlorobutene (or other cross-linking agent) is prepared by mixing approximately equal quantities, by weight, and thoroughly agitating. The reaction is completed very rapidly at room temperature. The mix may be dissolved in a water soluble solvent, such as acetone or dimethyl formamide, to aid in dispersing it in the starch.

A cross linking agent will be understood to include any bifunctional or polyfunctional compound in which two or more of the functional groups are capable of reacting with the hydroxyl groups of the starch. The derivative obtained in this manner was very good in pasting characteristics, adsorption of dye and clarity of aged paste.

EXAMPLES 5–11

The process set forth in Example 4 was repeated with 1.0–10.0% concentrations imidazoline compound-dichlorobutene reaction products to determine the influence of the concentration of this reactant on the properties of the final product. Reactant products of varying amounts of the imidazoline compound and dichlorobutene were prepared before adding to starch slurries, adjusted in Baumé to 18–20° and pH to 9. Reaction was allowed to proceed for 20 hours at 80° F. The properties of the modified starch products (Examples 5–11) and of the unmodified controls for these samples are presented in Table II.

TABLE II

| Ex. | Reactant | Gel. temp., °C. | Max. visc., gm./cm. | Visc. at 30', gm./cm. | A.P.V. gm./cm. | Nitrogen, percent | Dye test | Percent retention on pulp |
|---|---|---|---|---|---|---|---|---|
| C | None | 86 | 140 | 110 | 1,360 | 0.014 | Neg. | 68 |
| 5 | 1.5% I, 1.5% D | 78 | 340 | 180 | 400 | 0.088 | Pos. | 85 |
| 6 | 1.5% I, 0.5% D | 78 | 310 | 166 | 400 | | Pos. | |
| 7 | 1.0% I, 1.5% D | | Formed lumps in C.I.V. | | | | | |
| 8 | 0.5% I, 1.5% D | | Formed lumps in C.I.V. | | | | | |
| 9 | 2.0% I, 1.0% D | 77 | 380 | 200 | | 0.103 | Pos. | |
| 10 | 2.5% I, 2.5% D | 76 | 500 | 240 | | | | |
| 11 | 5.0% I, 5.0% D | 76 | 580 | 260 | | 0.116 | Pos. | |

I = 1-(2-hydroxyethyl), 2n-heptadecenyl-2 imidazoline.
D = Dichlorobutene.
C.I.V. = Corn industries viscometer.
A.P.V. = Aged paste viscosity.

These results indicate that reaction of starch with reaction products of 0.5–5.0% imidazoline compound and 0.5–5.0% dichlorobutene will give very good cationic starch derivatives. It will be seen from the above table that the following modifications in viscosity properties have occurred.

1. The gelatinization temperature was lowered 9–10° C. below that of the control samples.
2. In all cases, except Examples 7 and 8, the maximum viscosity of the hot pastes was increased, reaching its maximum value at 5.0% imidazoline compound and 5.0% dichlorobutene treatment level.
3. Set back on cooling, as measured by the Aged Paste Viscosity (A.P.V.), was significantly lowered at all levels of treatment.
4. Imidazoline compound dichlorobutene reactant product treated starches contain about 10 times the nitrogen of unmodified starch.
5. The percentage of retention on shredded paper pulp of the above modified starches was higher than that of the controls.
6. Imidazoline dichlorobutene treated starches gave positive dye test with "Light Green S.F. Yellowish" dye.

Starch derivatives with these superior cationic properties are useful in papermaking processes at various stages (wet end addition, for example) since the starch derivatives display remarkably greater retention to the wood pulp, improve the bursting strength, tensile strength, surface picking strength of the paper and also improve the retention of pigments, fillers, and various other additives in the paper. Such starch derivatives are also useful as flocculating agents for clarifying industrial waters, tailings from various rinsing operations and the like. Starch derivatives with these higher viscosities are also useful for adhesives and in corrugating, textile finishing such as back sizing, etc.

EXAMPLES 12–16

The influence of pH on the process set forth in Example 4 was determined by treating 18° Baumé starch slurries with 3.0% reactant product (1.5% imidazoline compound–1.5% dichlorobutene) for 20 hours at 80° F. at pH values of 6.0–10.0.

TABLE III

| Examples | pH | Gel. temp., °C. | Max. visc., gm./cm. | Visc. at 30', gm./cm. |
|---|---|---|---|---|
| Control (12–16) | | 87 | 155 | 130 |
| 12 | 6.0 | 77 | 430 | 178 |
| 13 | 7.0 | 78 | 420 | 200 |
| 14 | 8.0 | 77 | 460 | 170 |
| 15 | 9.0 | 77 | 500 | 150 |
| 16 | 10.0 | 76 | 445 | 220 |

These analyses show that the reaction can be conducted at a fairly wide pH range.

EXAMPLES 17–22

Examples 17–22 were conducted substantially as Example 4 on an 18° Baumé starch slurry with 3% reactant product (as in Examples 12–16) at a pH of 9.0 for 20 hours and at various temperatures as indicated in Table IV.

TABLE IV

| Examples | Temp. (° F.) | Gel. temp., °C. | Max. visc., gm./cm. | Visc. at 30', gm./cm. |
|---|---|---|---|---|
| Controls (17–22) | | 86 | 145 | 120 |
| 17 | 80 | 77 | 360 | 150 |
| 18 | 100 | 78 | 410 | 185 |
| 19 | 110 | 78 | 390 | 200 |
| 20 | 120 | 78 | 280 | 205 |
| 21 | *120 | 78 | 280 | 205 |
| 22 | 130 | 78 | 260 | 190 |

* 6-hour reaction.

Optimum temperature for maximum viscosity appears to be 80–110° F. Above this temperature range, there was some lowering of peak viscosity.

EXAMPLES 23–27

Examples 23–27 were repeated as Example 4 on 18° Baumé starch slurry with 3.0% reactant product (as in Examples 12–16) at a pH of 9 and at room temperature for 1 to 24 hours.

TABLE V

| Examples | Time (hrs.) | Gel. temp. °C. | Max. visc., gm./cm. | Visc. at 30', gm./cm. |
|---|---|---|---|---|
| Control (23–27) | | 86.5 | 138 | 105 |
| 23 | 1 | 82 | 160 | 115 |
| 24 | 2 | 82 | 160 | 128 |
| 25 | 4 | 80 | 190 | 130 |
| 26 | 6 | 78 | 240 | 135 |
| 27 | 24 | 77 | 360 | 200 |

These results indicate that 24 hours are required for complete reaction at 80° F. However, all of the starch derivatives gave positive cationic tests.

EXAMPLES 28–32

Examples 28–32 were conducted substantially as Example 4 on an 18° Baumé starch slurry with 3% reactant products of the imidazoline compound with each of various cross-linking agents at a pH of 9 for 24 hours at 80° F.

TABLE VI

| Examples | Cross-linking agent | Gel. temp., °C. | Max. visc. gm./cm. | Visc. at 30', gm. cm. | Dye test |
|---|---|---|---|---|---|
| Control (28–32) | None | 87 | 135 | 110 | Neg. |
| 28 | n-Octyl chlorothioformate | 76 | 350 | 110 | Pos. |
| 29 | Epichlorohydrin | 78 | 280 | 200 | Pos. |
| 30 | Divinylsulfone | 80 | 240 | 230 | Pos. |
| 31 | Ethylene Oxide | 77 | 390 | 160 | Pos. |
| 32 | Acrylonitrile | 78 | 420 | 195 | Pos. |

These results indicate that, in addition to dichlorobutene, n-octyl chlorothioformate, ethylene oxide, divinylsulfone, epichlorohydrin and acrylonitrile would be acceptable reagents for this reaction.

The features and principles underlying the invention described above in connection with specific exemplifications will suggest to those skilled in the art many other modifications thereof. It is accordingly desired that the appended claims shall not be limited to any specific feature or details thereof.

We claim:

1. The method of forming a cationic starch derivative comprising reacting an aqueous starch slurry adjusted to a pH of 6–10 with the reaction product of a cross-linking agent and 1(2-hydroxyethyl), 2n-heptadecenyl-2 imidazoline for a period of about 1 to 24 hours at a temperature of about 68° F. to about 130° F.

2. The method of claim 1 wherein the cross-linking agent and said imidazoline compound are mixed in substantially equal amounts by weight to form a reaction product mix for adding to the starch.

3. The method of claim 1 wherein said cross-linking agent is an agent selected from the class consisting of dichlorobutene, n-octyl chlorothioformate, divinylsulfone, ethylene oxide, epichlorohydrin, acrylonitrile and mixtures thereof.

4. The method of claim 1 wherein the cross-linking agent is dichlorobutene.

5. A cationic starch derivative consisting of the reaction product of starch with the pretreated mix of a cross-linking agent and 1(2-hydroxyethyl), 2n-heptadecenyl-2 imidazoline.

6. The cationic starch derivative of claim 5 wherein the cross-linking agent is dichlorobutene.

References Cited

UNITED STATES PATENTS 3,152,925  10/1964  Patel et al. _____ 127—33

DONALD E. CZAJA, *Primary Examiner.*

R. W. MULCAHY, *Assistant Examiner.*

U.S. Cl. X.R.

162—175